United States Patent [19]

Gingline

[11] Patent Number: 4,679,806
[45] Date of Patent: Jul. 14, 1987

[54] ARM REST AND HANDRAIL ASSEMBLY FOR BABY CARRIAGE

[75] Inventor: Lin Gingline, Tainan Hsien, Taiwan

[73] Assignee: Te-Chin Handicraft Enterprise Co., Ltd., Tainan Hsien, Taiwan

[21] Appl. No.: 830,810

[22] Filed: Feb. 19, 1986

[51] Int. Cl.$^4$ ............................................. B62B 7/14
[52] U.S. Cl. ................... 280/47.38; 280/757; 296/153; 403/102; 403/316; 403/325; 403/375; 297/488
[58] Field of Search ............... 280/47.38, 642, 643, 280/644, 757, 647, 648, 650; 297/148, 153 G, 488; 403/315, 316, 10 C, 325 C, 329, 330, 104, 109, 326, 327, 375

[56] References Cited

U.S. PATENT DOCUMENTS

| | | | |
|---|---|---|---|
| 1,190,491 | 7/1916 | Watts et al. | 403/327 |
| 2,875,815 | 3/1959 | Gill | 297/153 |
| 3,580,631 | 5/1971 | Murcott | 297/153 |
| 3,635,522 | 1/1972 | Kerwit | 297/153 |
| 4,108,468 | 8/1978 | Orlanski | 280/650 |
| 4,571,788 | 2/1986 | Bruengger | 403/316 |

*Primary Examiner*—John J. Love
*Assistant Examiner*—Eric D. Culbreth
*Attorney, Agent, or Firm*—Armstrong, Nikaido, Marmelstein & Kubovcik

[57] ABSTRACT

This invention discloses an improvement in and relating to the banisters of baby carriage, in which three segments of banisters, i.e., left-hand banister, right-hand banister and front banister, are engaged in a locking relationship in such way that the front banister may be freely assembled and disassembled at front ends of left-hand and right-hand side banisters. The assembling and disassembling procedures are simple and convenient. Moreover, after the front banister is disassembled the left-hand and right-hand side banisters keep a smooth and neat appearance without any other accompanying disassembled elements.

1 Claim, 3 Drawing Figures

ARM REST AND HANDRAIL ASSEMBLY FOR BABY CARRIAGE

This invention relates to the banisters of baby carriages, and particularly to three-segment banisters, in which the front banister may be freely assembled and disassembled, and after the front banister is disassembled, the left-hand and right-hand side banisters keep a neat appearance.

The subject banisters are used for hand-barrow type baby carriages to be secured thereon around left-hand, front and right-hand sides of the baby seat. Such hand-barrow type baby carriages are divided into two categories, namely, for sitting and for laying. The body of such carriage is foldable and the left-hand and right-hand side banisters, respectively, are securely locked on the body of the carriage.

In conventional three-segment banisters, the opposite ends of the front banister are engaged on front ends of left-hand and right-hand banisters, respectively by connecting bolts. When the front banister is disassembled, the front ends of left-hand and right-hand side banisters present notches or fork openings which impair the appearance. Further, the connecting bolts, disassembled from the front banister, are small in size and easily lost.

The object of this invention is to provide an improvement in the banisters of baby carriage which eliminates any elements that would be disassembled. The front banister, itself, is the only movable element to be disassembled, and keeps a smooth and neat appearance after the front banister is disassembled.

The aforementioned object is accomplished according to the present invention by a structure in which the opposite ends of the front banister are provided with locking apertures. At the underside and front ends of left-hand and right-hand side banisters, respectively, are provided locking means built inside of the banister housings. The locking means comprises a locking chamber provided with an opening in the front end face of the side banister. The locking chamber is provided with an elastic plate at the inner end of the chamber. The elastic plate, at its front end and upper side, has a stopper raised on the inside of the locking chamber and, at lower side, at its front end, a trigger for pulling down the elastic plate. Inside of the locking chamber a reciprocating pusher is provided. A return spring is provided between the rear end of the pusher and the back wall of the locking chamber. The upper side of the pusher is provided with a protrusion which projects into the groove formed in the upper wall of the locking chamber which permits the pusher to be reciprocatably restrained within the locking chamber. When the front banister is engaged with the left-hand and right-hand side banisters, the opposite ends of the front banister are inserted, respectively, into the afore-mentioned locking chambers through the openings to retract the pusher and force the locking aperture, at the underside thereof, into engagement with the stopper. To release and remove the front banister, the trigger is moved downward, the stopper along with elastic plate is lowered to release the locking relationship and the opposite ends of the front banister are moved out of the locking chamber by the pusher and the compressed return spring. The pusher advances to a position where the front end face thereof is flush with the front end face of the side banisters to fill the opening of the locking chamber.

In the structure according to the present invention, as mentioned above, during the disassembling process of the front banister only the front banister itself is disassembled. This provides not only a simple and convenient assembling and disassembling operation but also a smooth and perfect appearance of left-hand and right-hand banisters after the front banister is removed.

These other objects and features according to the present invention will be more apparent from the following description for illustration purposes with reference to the accompanying drawings, in which.

Figure 1:
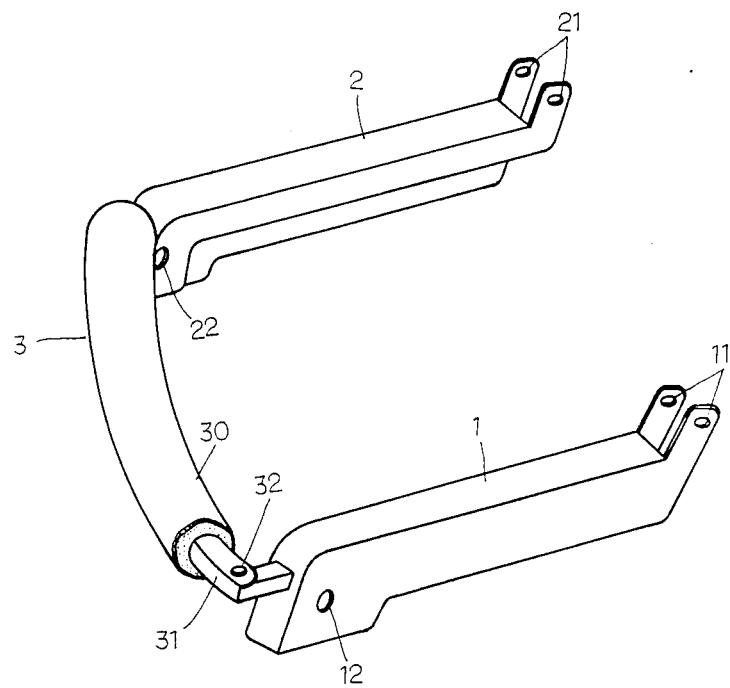
FIG. 1 is a perspective view of one embodiment of the banisters of baby carriage according to the present invention.

As illustrated in the drawings and best shown in FIG. 1, the structure of this embodiment comprises left-hand side banister 1, right-hand side banister 2 and front banister 3. The left-hand and right-hand side banisters 1 and 2, respectively, are secured on the carriage frame by rear screw holes 11, 21 and front holes 12, 22. The front banister 3 including outer soft sheath 30 and skeleton 31 is engaged at both ends via the skeleton 31 with the front ends of the left-hand and right-hand side banister 1 and 2, respectively. The skeleton 31 may be deflected at opposite ends and the deflected connecting portions are securely engaged by shaft pin 32.

Figure 2:
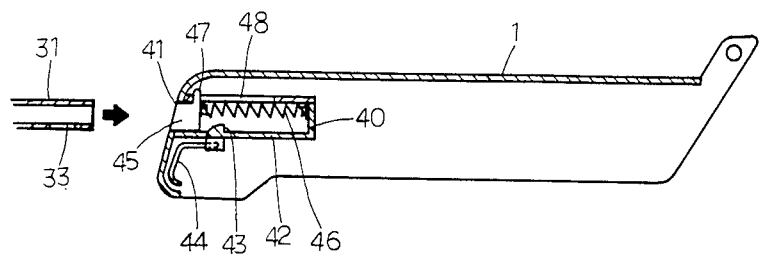
FIG. 2 is a fragmentary cross sectional view of one side banister in disassembled state with front banister.

The structure on the engagement between the front banister 3 and left-hand side banister 1 (or right-hand side banister 2) is embodied in FIG. 2. In this embodiment, at both end deflected portions, the underside of front banister skeleton 31 is provided with a locking aperture 33. The front end of the left-hand side banister 1 (or right-hand side banister 2) is provided with locking means built inside of the banister housing. The locking means has a locking chamber 40 with an opening 41 formed at front end face of the left-hand side banister 1. At the bottom side of the locking chamber there is an elastic plate 42. At its upper side at its front end, elastic plate 42 is provided with a stopper 43 raised on bottom plane inside of the locking chamber. At its lower side, at its front end, elastic plate 42 is provided with a trigger 44 for pulling down the front end of elastic plate 42. Within the locking chamber 40, a reciprocating pusher 45 is provided. A return spring 46 is disposed between the rear end of pusher 45 and the back wall of the locking chamber. At upper side of pusher 45, a protrusion 47 is formed projecting into groove 48 provided on the upper wall of the locking chamber. The groove 48 permits the pusher 45 to reciprocate within the locking chamber.

The upper wall of the locking chamber 40 is separately manufactured. After pusher 45 and return spring 46 are placed into locking chamber, a cover making up the upper wall of locking chamber 40 is placed over and attached to locking chamber 40. To prevent the return spring 46 from displacement, a pair of blocks are formed at the rear end of pusher 45 and the front of back wall of locking chamber 40 to extend into the opposite ends of the return spring.

Stopper 43 is inclined at its forward side to reduce resistance when the front end of the front of the banister is inserted in an engaged in locking relationship with stopper 43.

Trigger 44 is snap-fitted into the cavity at the underside at the front end of the elastic plate 42.

In the state shown in FIG. 2, the end of the front banister skeleton 33 is inserted into the locking chamber 40 through the opening 41 in the direction of arrow to retract the pusher 45, compress return spring 46 and pass over stopper 43. When the locking aperture 33 reaches the location over stopper 43, the latter is returned upwardly into locking aperture 33 so as to engage between skeletons 33 at the front of the banister 3 at the left-hand and right-hand sides of banister 3, as shown in FIG. 3.

Figure 3:
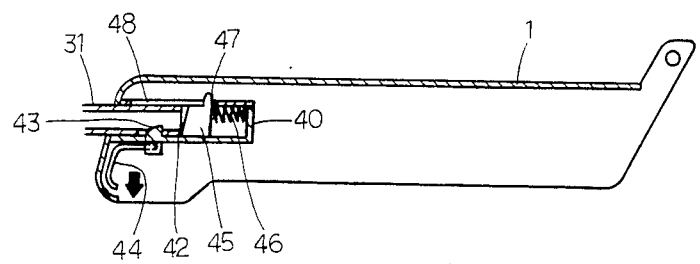
FIG. 3 is a cross sectional view similar to FIG. 2 but showing the assembled state.

Under the assembled state as shown in FIG. 3, when the trigger 44 at side banisters 1 and 2 are pulled down in the direction of arrow, the stoppers 43 will be lowered along with the elastic plates 42 to release the front banister 3 from locking relationship. The opposite ends of the front banister 3 are retracted out of the locking chamber 40 by the pusher 45 and the elastic force of the return spring 46 in returning to the disassembled state as shown in FIG. 2.

The location of the locking aperture 33 in aforementioned embodiment may be changed in relation to a change in the position of stopper 43. Further, the provision of the trigger 44 is intended to release the stopper 43 from locking relationship. Besides the trigger 44, equivalent means for releasing stopper 43 from locking relationship can be used. Any change location of the locking aperture 33 with respect to the stopper 43 or any equivalent means to release the stopper 43 out of the locking aperture 33 are included in the present invention and within the scope of protection of the claim.

What I claim is:

1. An improved banister for a baby carriage comprising left-hand and right-hand side banisters and a front banister, said left-hand and right-hand side banisters having open front ends, said front banister having locking projections at its opposite ends for insertion into the open front ends of said left-hand and right-hand banisters, respectively, said locking projections each having an aperture in the underside of each such projection, each of said left-hand and right-hand banisters having in said open front ends a locking chamber for receiving such projection, a plate in each said locking chamber slidable from the front to the back of each said chamber and resilient means in each said chamber for urging said plate in each said open end to the front end thereof, a protrusion at the upper side of each said slidable plate extending in a groove in the upper wall of said chamber for receiving said slidable plate protrusion and for guiding said plate and a stopper in the bottom wall of each said chamber, said stopper having a sloping front wall, a vertical back stopping wall, a spring for urging said stopper into said chamber and a trigger for extracting said stopper from said chamber, the forward end of the protrusions on said front banister contacting the sloping front wall of said stopper to depress said stopper against the tension of said spring as said front banister protrusions are inserted, said stopper being urged upward by said spring into the aperture when said stopper and aperture are aligned, said stopper being withdrawn from said banister when said trigger is actuated, said aperture being located in an underside of said front bannister projection.

* * * * *